US 6,633,580 B1

United States Patent
Tørudbakken et al.

(10) Patent No.: US 6,633,580 B1
(45) Date of Patent: Oct. 14, 2003

(54) NxN CROSSBAR PACKET SWITCH

(75) Inventors: Ola Tørudbakken, Fjellhamar (NO); Morten Schanke, Oslo (NO)

(73) Assignee: Sun Microsystems, Palo Alto, CA (US)

( * ) Notice: Subject to any disclaimer, the term of this patent is extended or adjusted under 35 U.S.C. 154(b) by 0 days.

(21) Appl. No.: 09/520,066

(22) Filed: Mar. 7, 2000

(51) Int. Cl.[7] .............................. H04J 3/02; H04L 12/56
(52) U.S. Cl. ..................... 370/461; 370/395.4; 370/418
(58) Field of Search .............................. 370/360, 395.1, 370/395.4, 411–418, 447, 461, 462, 229–236

(56) References Cited

U.S. PATENT DOCUMENTS

| | | | | |
|---|---|---|---|---|
| 5,267,235 A | * | 11/1993 | Thacker | 370/416 |
| 5,680,402 A | | 10/1997 | Olnowich et al. | 370/498 |
| 5,689,500 A | * | 11/1997 | Chiussi et al. | 370/418 |
| 6,067,298 A | * | 5/2000 | Shinohara | 370/413 |
| 6,212,194 B1 | * | 4/2001 | Hsieh | 370/414 |
| 6,249,528 B1 | * | 6/2001 | Kothary | 370/395.53 |
| 6,449,283 B1 | * | 9/2002 | Chao et al. | 370/462 |

FOREIGN PATENT DOCUMENTS

| | | |
|---|---|---|
| WO | 9935879 | 7/1999 |
| WO | 9957857 | 11/1999 |

OTHER PUBLICATIONS

McKeown, N. "The iSLIP Scheduling Algorithm for Input–Queued Switches" IEEE Transactions on Networking, vol. 7, No. 2, pp. 1–34, (1999).

Gustad, P., et al. "High Performance Switching and Congestion Avoidance in SCI." 3rd International Conference on Sci–Based Technology and Research, p. 26–35, (2000).

* cited by examiner

Primary Examiner—Steven Nguyen
(74) Attorney, Agent, or Firm—Ladas & Parry

(57) ABSTRACT

A novel NxN Crossbar Packet Switch is disclosed, which crossbar switch is based on a distributed port architecture, asynchronous output port arbitration, support of non fixed-size packets (cells), support for virtual channels (VC) and/or priority, and which only requires 2*N*N control lines for the arbitration.

17 Claims, 7 Drawing Sheets

NxN Crossbar Packet Switch block diagram

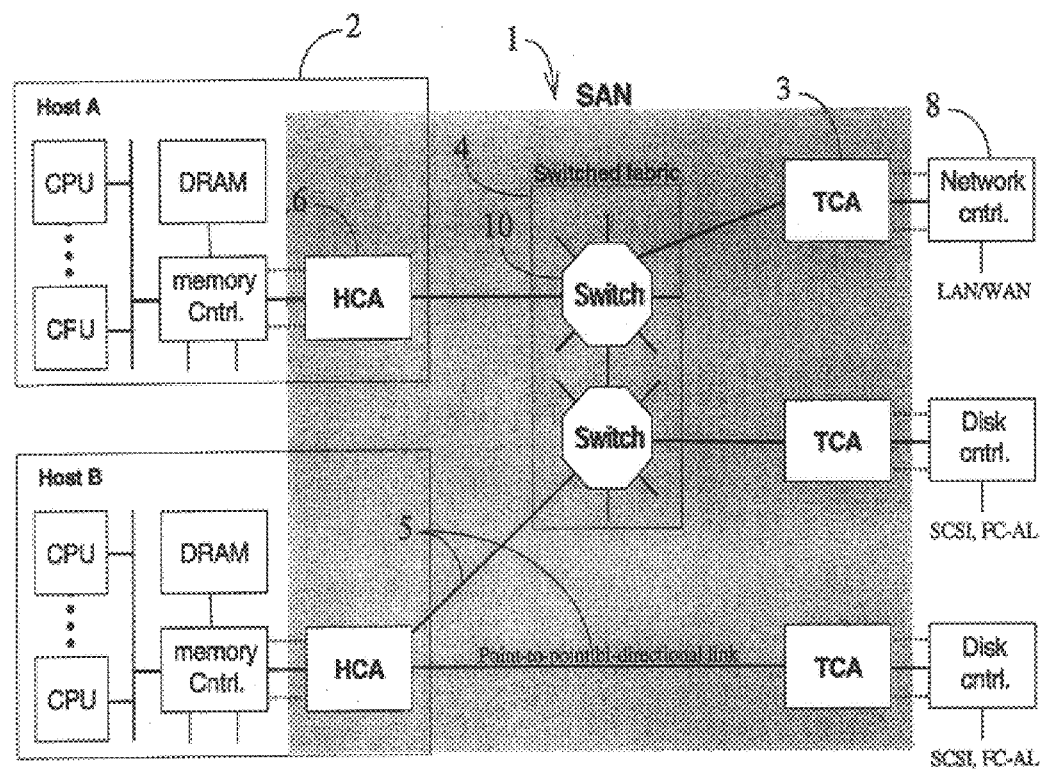
Figure 1. System Area Network

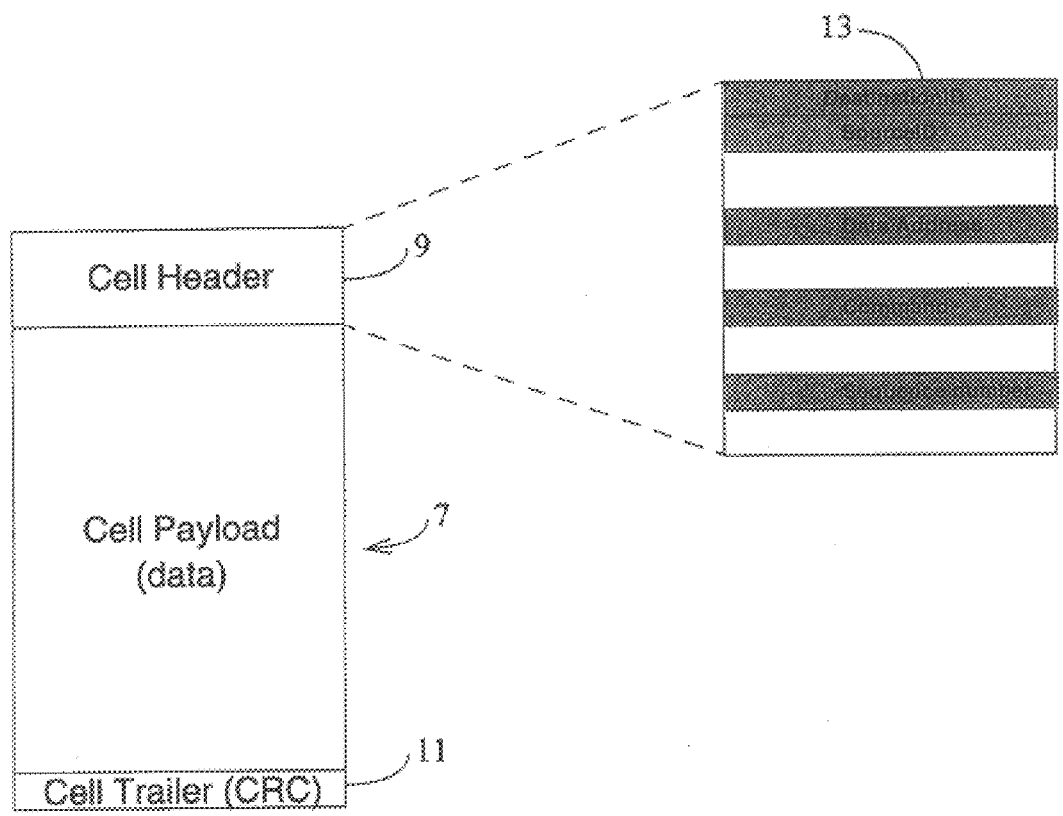
Figure 2. Data Cell

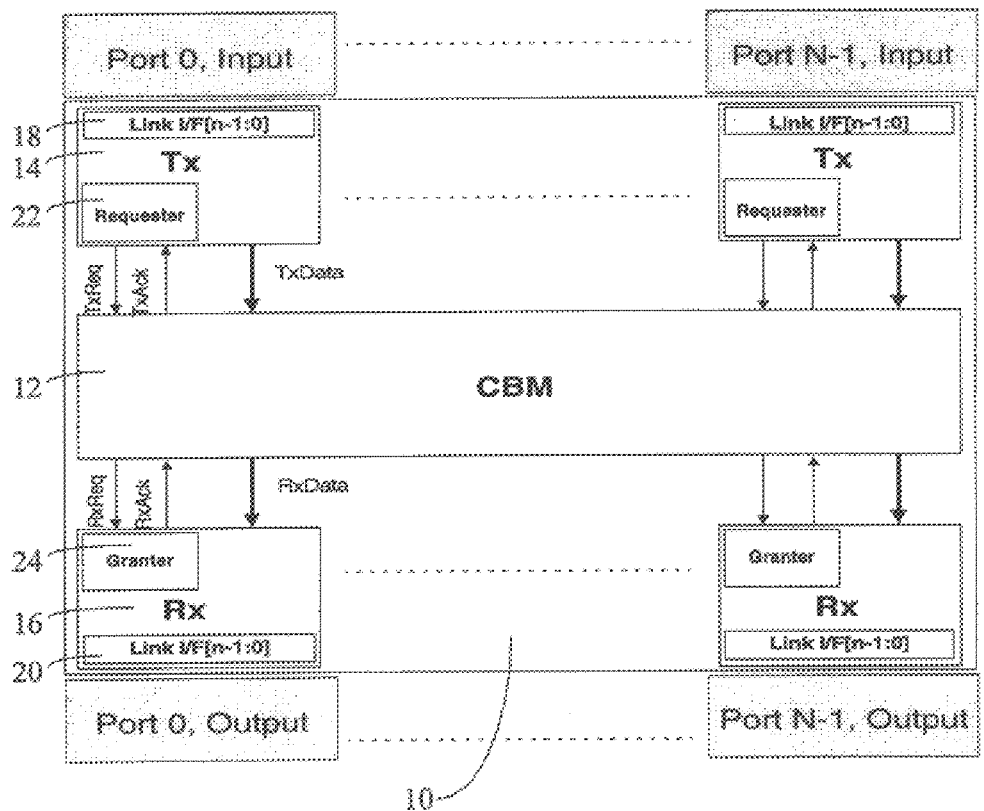
*Figure 3. NxN Crossbar Packet Switch block diagram*

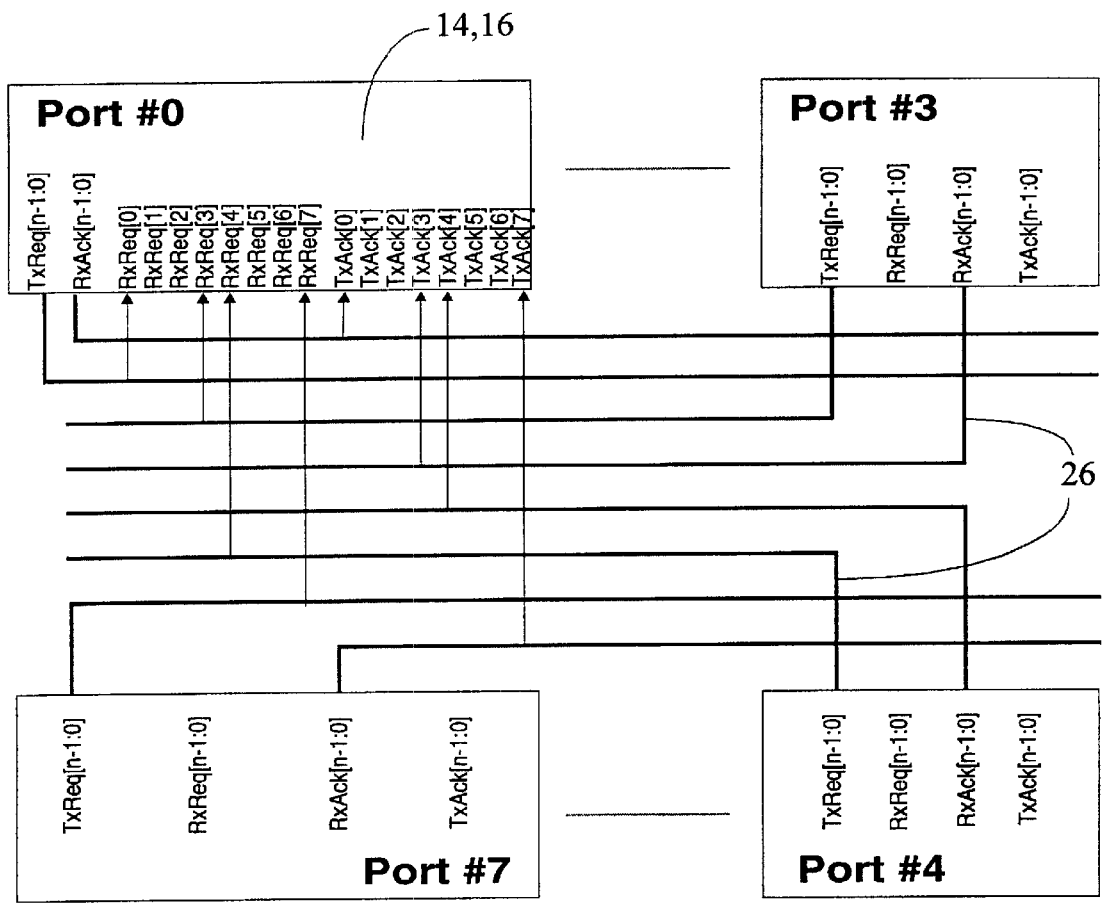
*Figure 4. Example: Control signals/connectivity, N=8*

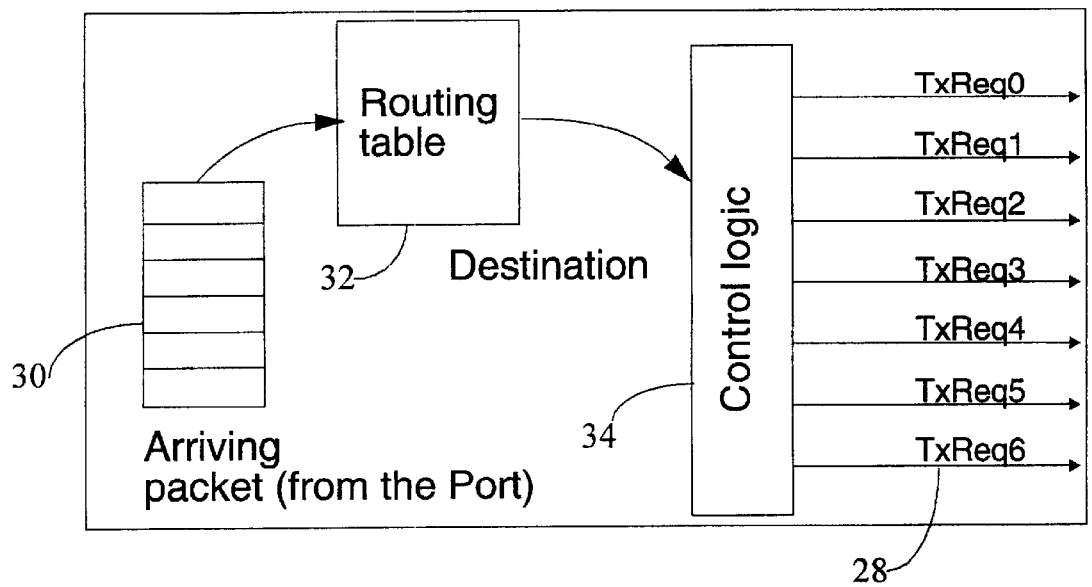
*Figure 5. Destination selection, simplified view*

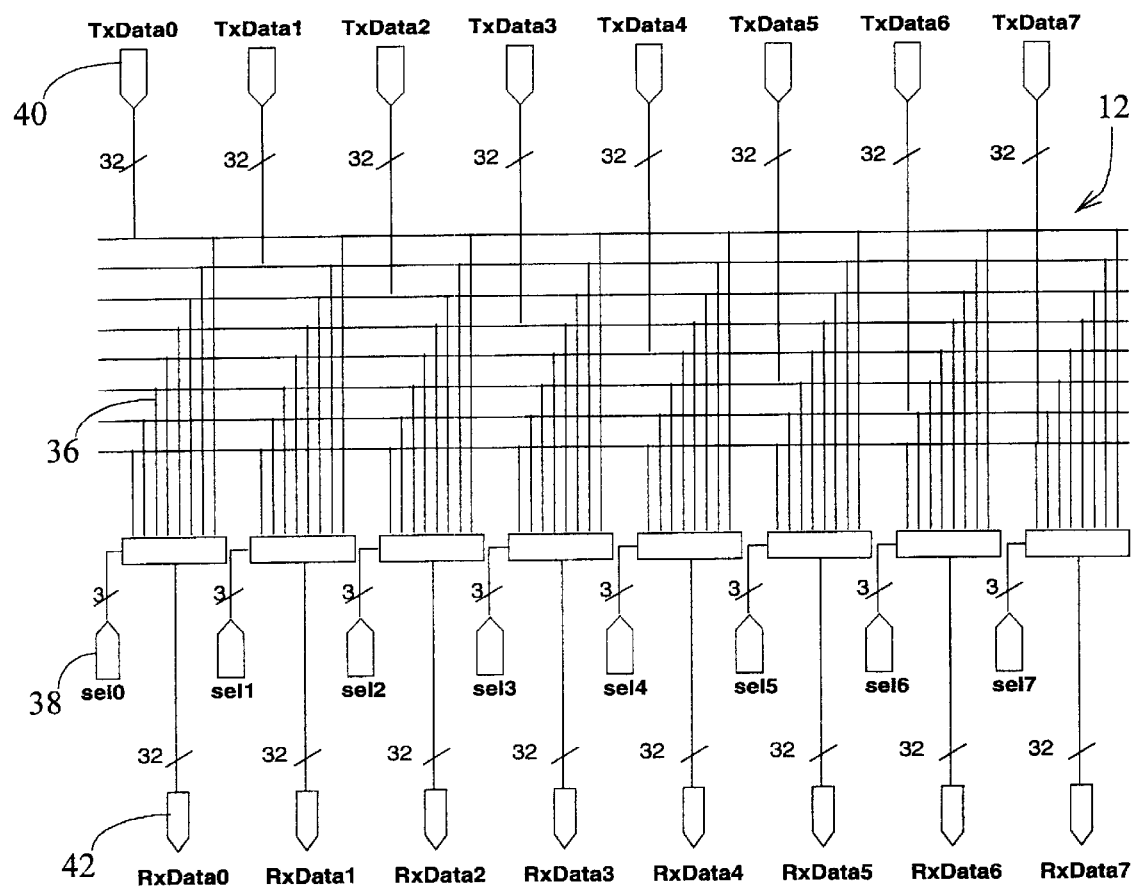
Figure 6. NxN CBM (N=8)

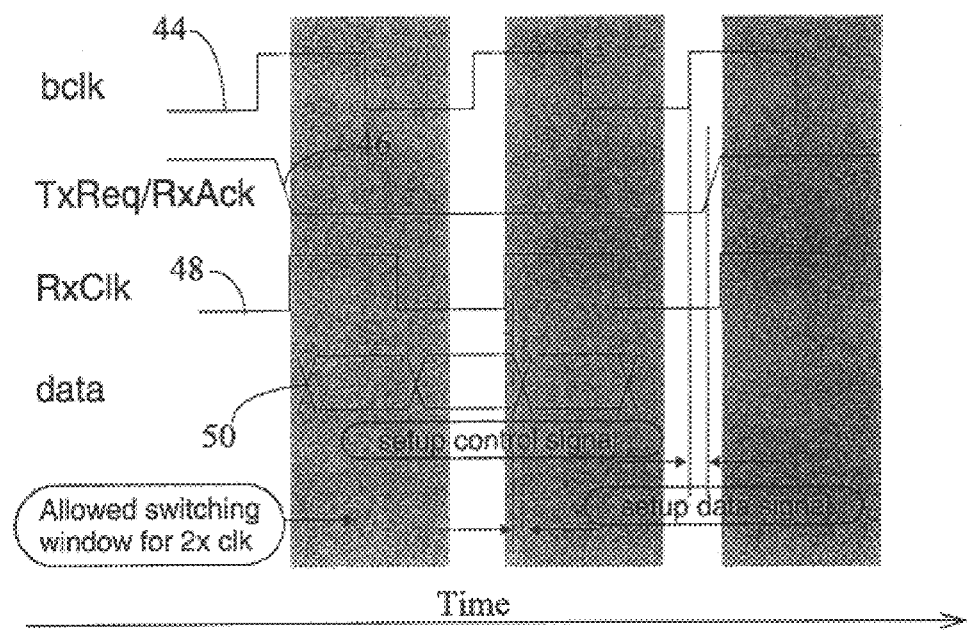
Figure 7. NxN Crossbar packet switch clocking scheme

N×N CROSSBAR PACKET SWITCH

BACKGROUND OF THE INVENTION

The present invention relates generally to computer networks, and more particularly, to a crossbar packet switch suitable for use, in a switching fabric in a computer network. Crossbar switches are generally considered to be the best (performance-wise) packet switches possible to construct. Current known crossbar designs usually implement synchronous time-slotted output port arbitration, and are based on switching of fixed-size date packets. Some reference designs (e.g. 'Knockout Switch' developed by Yeh, Hluchy, and Acampora, and 'gauss Switch' designed by de Vries and used by the Dutch state telephone company) are also subject to packet (or cell) loss as a result of congestion.

U.S. Pat. No. 6,838,682 to Wicki et al. discloses a crossbar switch in a router circuit. However, the Wicki et al. switch is based on a N×M×N crossbar matrix where M is the number of input buffers per input port thus increasing the size of a standard N×N crossbar, and its arbitration protocol further does not support virtual channel and/or priorities.

Further, McKeown et al. describe in "Tiny Tera; A Packet Switch Cora", IEEE Micro, Jan./Feb. 1997, pp 26–33 a crossbar switch configuration particularly intended for high speed networks supporting IP. However, the McKeown et at. switch configuration only supports transmission of fixed-size packets, and is based on synchronous time-slotted output port arbitration. It further does not support virtual channels and/or priorities, and it requires use of virtual output queueing at the input.

To implement e.g a System Area Network (SAN) switch based on the previously known crossbar designs referred above, is not desirable for several reasons:
1) Packet size: Typical packet sizes in a SAN could range from tens of Bytes to several hundreds of Bytes. Hence, a SAN switch should not be restricted to fixed-size packets.
2) With a non fixed-size packet a time-slotted arbitration scheme is not desirable due to latency trade-off between small packets and large packets. This calls for non-time-slotted arbitration, i.e. asynchronous arbitration.
3) Virtual Channels and/or Priorities are usually considered to be a requirement in SAN. Thus, the crossbar switch needs to provide a method of sending back information from the output port to the input port concerning the state (Virtual Channel/priority state) of a particular output queue.
4) A switch port in a SAN usually must offer a raw bandwidth in the range of tens of Gbit/s. To achieve this bandwidth with current technology, bundles of 2.5 Gbit/s serializers/de-serializers (SerDes) are usually constructed. These SerDes require many phase-locked loops (PLLs). With current technology there is a limitation to how many PLLs can possibly be put onto one Application Specific Integrated Circuit (ASIC). Therefore it is desirable to choose an implementation which does not require a centralized arbitration scheme.

SUMMARY OF THE INVENTION

To satisfy the above mentioned requirements and to solve the problems of the is prior art, there is provided, in accordance with the present invention,
a crossbar switch for a network, the crossbar switch being an N×N switch having N input ports each with a plurality of buffers capable of storing one data cell) each, and N output ports each with a plurality of buffers capable of storing one data cell each, for switchably coupling any of the N input ports to any of the N output ports, wherein
the switch contains N output port arbiters, the N arbiters operating asynchronously with respect to each other,
each of the N input ports includes a data cell scheduler, each such scheduler being operative to forward a special flag with the data cells to signal start-of-cell and end-of-cell,
the N arbiters and the N schedulers are interconnected by 2×N×N control lines,
the switch output ports operating under an arbitration protocol controlling use of said 2×N×N control lines, the protocol being operative to support the indication of:
output port busy serving another input port
output port active
output port not operational
output port accepting a data cell from an input port and having free output port buffers within a virtual channel and/or priority class for this accepted data cell
output port accepting a data cell from an input port, but not having free output port buffers within a virtual channel and/or priority class for that accepted data cell,
whereby the switch is able to support transmission of non-fixed size data cells.

In a favorable embodiment of the present invention, each of the N input port schedulers has N request output lines and N acknowledge input lines. Similarly, each of the N output port arbiters may be round robin arbiters having N request input control lines and N acknowledge output control lines.

In an even more favorable embodiment, each of the $N^2$ input port scheduler request output lines is wired to a request input control line for a corresponding output port. Similarly, each of the $N^2$ output port arbiter acknowledge output control lines may be wired to an acknowledge input line for a corresponding input port.

The scheduler may be operative to forward a clock signal with the data calls, during a data cell transmission from one input port to one output port.

Each input port scheduler may be operative to send a request to an output port for which the scheduler has a queued data cell, by asserting the request output line for that particular output port.

Each output port arbiter may include a first-level aging scoreboard mechanism for output port ownership reservation. In such an embodiment of the invention, each output port arbiter may be operative to monitor the N request input lines, and to send a grant to the one input port that appears next in a fixed round robin schedule or appears in the first-level scoreboard by asserting the acknowledge line for the one input port.

Each output port arbiter may be operative to monitor the N request input lines, and to send an output port busy indication to input ports that were not granted access, by asserting the acknowledge lines for those input ports, the input ports that were not granted access being placed in the scoreboard reservation, hereby giving preference to these input ports at the next output port ownership arbitration, and the output port busy indication being de-asserted whenever the output port is ready for a new output port arbitration.

Each output port arbiter may include a second-level aging scoreboard mechanism for buffer reservation. The output port arbiter that granted one input port access, may be operative to accept a data cell from the one input port if a free output port buffer within a virtual channel and/or priority class for that data cell exists, by asserting the acknowledge line for the one input port, or to reject the cell from that one input port if no free output port buffer exists within a virtual channel and/or priority class for that data cell, by not asserting the acknowledge line for that one input port. In this case, an output port may be operative to reserve, after having rejected a data cell from the one input port, an entry in the said second level scoreboard, hereby reserving an entry for this data cell during a next arbitration interval.

An output port may be judged to be not operational if it does not react to any request input line.

In another embodiment, each input port scheduler is operative to remove a data cell from its corresponding input port buffer, if an output port for which that data cell is destined, is not operational.

Each input port scheduler may be operative to retry request for transmission of a data cell to an output port until that output port grants the input port owrership.

Each input port scheduler may be operative under a protocol that does not allow it to transmit any data cell within one certain virtual channel or priority to any output port holding a previously transmitted data call from the same input port within said certain virtual channel or priority and for which the output port in question did not have sufficient buffer space, said previously transmitted data call being reserved in the output port arbiter second level scoreboard, before said previously transmitted data cell is finally accepted by said output port. However, to ensure fairness and forward progress between various output ports and/or between virtual channels/priorities, said protocol does allow said scheduler to transmit a data cell to another output port or within another virtual channel/priority.

BRIEF DESCRIPTION OF THE DRAWINGS

The above and other aspects of the present invention will become apparent from the following description read in conjunction with the accompanying drawings wherein the same reference numerals have been applied to like parts, and in which FIG. 1 is a block diagram showing an example of a System Area Network in which a switch in accordance with the present invention may be included, FIG. 2 shows an example of a typical data cell with a cell header, FIG. 3 is a block diagram showing main blocks constituting a crossbar switch in accordance with a preferred embodiment of the invention, FIG. 4 illustrates by means of a simplified block diagram connectivity for control signals in a crossbar switch in accordance with a preferred embodiment of the invention, FIG. 5 is a simplified block diagram showing destination selection for a data packet in a transmitter in a crossbar switch in accordance with a preferred embodiment of the invention, FIG. 6 is a sketch illustration indicating the basic principle behind an N×N crossbar matrix for switching data packets from any input port to any output port, and FIG. 7 is an illustration of a clocking scheme for a crossbar switch in accordance with a preferred embodiment of the invention.

DETAILED DESCRIPTION

FIG. 1 is a block diagram outlining main features of a so-called System Area Network (SAN) 1. A SAN is a network which interconnects a plurality of computers (hosts) 2 and a plurality of IO-devices 8, and/or IO-subsystems. This enables Inter-Processor Communication (IPC), (or clustering), host-to-peer (IO) communication, and peer-to-peer communication, over the same network. The host SAN access point is called a Host Channel Adapter (HCA) 6, while the peer SAN access point is called the Target Channel Adapter (TCA) 3. Interconnection between HCAs and/or TCAs is handled by high-performance point-to point links 5 and switch fabrics 4, 10.

The switch fabric contains switches 10 for routing data cells in accordance with their destination. The present invention relates to such switches, i.e. to a crossbar switch having N input ports and N output ports and with the ability to route data cells from any input port to any output port. It should be appreciated that the N×N crossbar packet switch of the invention may be used in other networks also, however the problems solved by this particular switch are problems relating to System Area Networks in particular.

In FIG. 2 is depicted the general layout of a data cell 7, with a cell header part 9 and a cell trailer part 11 in addition to the cell payload. As indicated in an enlarged part of the figure, the cell header includes a destination address (Destination ID) 13 describing the network address to which the cell should be routed by the switch fabric.

FIG. 3 it a block diagram outlining important features of the N×N crossbar packet switch 10 in a preferred embodiment thereof. Input ports and output ports are numbered from 0 to N−1. For every input port there is arranged a transmitter module Tx 14, and for every output port there is a receiver module Rx 16. A crossbar matrix module CBM 12 is arranged centrally between the arrays of transmitter and receiver blocks 14, 16.

As indicated in the figure, every Tx module 14 transmits data cells TxData into the CBM module 12 for routing to the proper Rx module 16 after set-up of the CBM. However, to ensure proper CBM set-up, first some exchange of control signals is necessary between transmitter and receiver modules.

A Tx module contains a Requester block 22 implementing inter alia a, scheduler function. Similarly, an Rx module contains a Granter block 24 implementing inter alia an arbitration function. Further, the Tx and Rx modules are provided with link interface sections 18, 20 to the fabric outside the N×N crossbar switch.

Control Signals

With reference to FIG. 4, which is a sketch of the control connectivity (which consists of 2*N*N signals), the following control signals are needed:

TxReq[N−1:0]: Requester request output line
TxAck[N−1:0]: Requester acknowledge input line
RxReq[N−1:0]:Granter request input line
RxAck[N−1:0]:Granter acknowledge output line The TxReq/RxAck outputs are routed to the appropriate RxReq/TxAck inputs of each of the other devices. Hence all control signals are point-to-point and can be easily terminated as transmission lines 26.

Data Signals

Referring again to FIG. 3. Txbata consists of the following signals:

Data[n−1:0]
TxFrame: Signal indicating start-of packet and end-of-packet. Thus, the arbitration protocol is independent of the actual packet length.

TxClk: Data transmit clock
RxData consists of the following signals:
Data[n−1;0]
Rxframe: Signal indicating start-of packet and end-of-packet
RxClk: Data transmit clock

Tx Module

Requester

Still referring to FIGS. 3 and 4, one transmitter 14 is allowed to request one receiver 16 per time. i.e. a transmitter S requests a receiver N using its TxReqN control signal. The receiver responds with its RxAckS control signal informing the transmitter whether the transmitter was granted access to the receiver input channel, and (if the transmitter was granted access) reports whether the packet was accepted or busied. If the packet is not accepted (busied), the transmitter is responsible for retrying the packet until it is finally accepted. The transmitter does not allow any other packet within the same virtual channel or priority, to bypass the busied packet. However, in order not to starve other CBM outputs the transmitter also requests other output. This ensures packet ordering. Fairness between CBM output ports is achieved by use of a round-robin scheduler in the transmitter.

Destination Selection

Referring to FIG. 5, the transmitter will perform the routing decision. A table 32 routing look-up will be performed on all packets 30 received from the N×N Crossbar Packet Switch Link I/F 18. Based on the result from the lookup, a destination request line 28 will be activated by control logic 34.

Rx Module

The receiver arbitration is divided into 2 phases:

Receiver ownership arbitration

Buffer reservation protocol

Receiver ownership arbitration

To assure fairness between the various transmitters 14, the receiver 16 monitors the RxReq[7:0] signals and grants the transmitters access to its input channel in a round-robin fashion. This ensures that all transmitters gets equal access to the receiver input channel. A busied transmitter is put into a scoreboard (reservation mechanism), to ensure that the transmitter will not be starved.

Buffer Reservation Protocol

Each receiver 16 also implements a buffer reservation protocol (VC and/or priority). The data packet is accepted if the receiver has free buffer space belonging to the VC or priority class to which the packet belongs. If not, the packet is busied and buffer space reserved. In this case a second-level scoreboard is used.

Receiver Input Channel Status

The receiver 16 reports the status of its input channel (free or busy) to all transmitters 14 by asserting RxAck. Thus the transmitter knows when the receiver input channel becomes available.

The Crossbar Matrix (CBM)

Referring to FIG. 6, the CBM 12 is a. N×N Crossbar Matrix, which can be implemented in a number of different ways. The basic principle is illustrated in the figure. There are N n-bit matrix input ports 40 and N n-bit matrix output ports 42 (in the figure N=8). Each matrix input port can be assigned to each matrix output port. The matrix output port assignment is controlled by N selectors 38 (a-bit, where N=2**a); one selector per output port from the corresponding Rx module. The interconnection line network is indicated generally by reference numeral 36.

Clocking Scheme

The N×N CBS employs a clock scheme with 3 clocks, see FIG. 7. The bclk 44 is the main clock driving the internal logic. There are two additional clocks, one 48 for receive (RxClk) and one 46 for transmit (TxClk), used only to clock the received and transmitted data 50 respectively. The rationale behind this is to allow phase adjustment according to actual travel distance through the CBM 12. In the Nxm crossbar switch protocol, there are two groups of signals:

1) Control signals running at bclk speed (TxReq, TxAck)
2) TxData/RxData (Data[n−1:0], xFrame, xClk) signals run at both edges of the bclk. The signals are clocked out by the TxClk clock and in by the RxClk. The TxClk is sent with the data through the CBM, and is input to the RxClk. This allows the system designer to adjust and optimize the clocking scheme with the following limitations: The receive clock is internally synchronized with the bclk, hence the system designer must assure proper setup and hold relations between the two clocks, as given in signal AC specification.

Link I/F

The 2*N Link I/F's (18, 20) (input/output pairs) of bit width n are interfaces between the N×N Crossbar Packet Switch (10) and the link layer (or outer world). Packets (or cells) crossing the Link I/F require a destination address and optionally a VC and/or priority bit field.

DETAILED EMBODIMENT

In a practical embodiment of the present invention, intended for use in a system area network, the N×N crossbar switch may be an 8×8 switch consisting of eight LC3 router chips (link controller-3, third generation SCI IEEE std. 1596 router chip) and an 8-way crossbar matrix. In this implementation each LC3 contains an input port as well as an output port, and each port has a bandwidth of 800 MByte/s. The 8-way crossbar matrix is segmented into 8×32-bit output ports and 8×32 bit input ports, each clocked at 200 MHz. The total crossbar bandwidth is 6.4 GByte/s. The architecture of this 8×8 switch can be viewed as four separate layers, externally a physical layer, followed by a logical layer and a virtual channel layer, and closest to the crossbar matrix a N×N layer. The present invention actually deals with the N×N layer and the crossbar matrix, but the functions of every layer is repeated here:

N×N layer:

This layer has three main functions: 1) Request other LC3s, 2) Arbitrate among the requesting LC3s regarding which should be given access to the. LC3 input channel, 3) configure and setup the crossbar matrix based on step 2.

Virtual channel layer:

The VC layer divides the physical/logical layers into multiple virtual channels, to selectively allow un-blocked traffic to proceed, while preventing congested channels from occupying all available buffer space. This prevents throughput collapse, and ensures forward progress independently of the load elsewhere in the system area network.

Logical layers:

The SCI physical/logical layer implements the ANSI/IEEE std. 1596–1992, which provides a light-weight, low latency, reliable split transaction point-to-point communication protocol.

Physical layer:

The physical layer implements the IEEE 1596.3 std. for differential signals (LVDS) over SCI, with a 16-bit output data path and a 16-bit input data path. For future cost optimization the parallel protocol can easily be migrated to a commodity high-speed serial protocol (2.5 Gbit/s) with a 8b/10b encoder/decoder.

The practical crossbar matrix is an 8-way crossbar, which can be implemented in a number of different ways, e.g. PLD, analog/digital ASIC, pipelined/non-pipelined.

In the above description, reference has been made to an embodiment of the invention particularly as depicted in the appended drawings. However, it will be appreciated that various modifications and alterations might be made by persons skilled in the art without departing from the spirit and scope of tho present so invention. The scope of the invention should therefore only be restricted by the claims that follow, or equivalents thereof.

What is claimed is:

1. A crossbar switch for a network, said crossbar switch being an N×N switch having N input ports each with a plurality of buffers capable of storing one data cell each, and N output ports each with a plurality of buffers capable of storing one data cell each, for switchably coupling any of said N input ports to any of said N output ports, wherein said switch contains N output port arbiters, said N arbiters operating asynchronously with respect to each other, each of said N input ports includes a data cell scheduler, each said scheduler being operative to forward a special flag with the data cells to signal start-of-cell and end-of-cell, said N arbiters and said N schedulers are interconnected by 2×N×N control lines, said switch output ports operating under an arbitration protocol controlling use of said 2×N×N control lines, said protocol being operative to support the indication of;

output port busy serving another input port output port active output port not operational output port accepting a data cell from an input port, and having free output port buffers within a virtual channel and/or priority class for this accepted output port accepting a data cell from an input port but not having free output port buffers within a virtual channel and/or priority class for that accepted data cell, whereby said switch is able to support transmission of non-fixed size data cells.

2. The crossbar switch of claim 1, wherein each of said N input port schedulers has N request output lines and N acknowledge input lines.

3. The crossbar switch of claim 1, wherein each of said N output port arbiters are round robin arbiters having N request input control lines and N acknowledge output control lines.

4. The crossbar switch of claim 2, wherein each of said $N^2$ input port scheduler request output lines is wired to a request input control line for a corresponding output port.

5. The crossbar switch of claim 3, wherein each of said $N^2$ output port arbiter acknowledge output control lines is wired to an acknowledge input line for a corresponding input port.

6. The crossbar switch of claim 1, wherein said scheduler is operative to forward a clock signal with the data cells, during a data cell transmission from one input port to one output port.

7. The crossbar switch of claim 2, wherein each said input port scheduler is operative to send a request to an output port for which said scheduler has a queued data cell, by asserting the request output line for that particular output port.

8. The crossbar switch of claim 3, wherein said output port arbiter includes a first-level aging scoreboard mechanism for output port ownership reservation.

9. The crossbar switch of claim 8, wherein each said output port arbiter is operative to monitor said N request input lines, and to send a grant to the one input port that appears next in a fixed round robin schedule or appears in said first-level scoreboard reservation, by asserting the acknowledge line for said one input port.

10. The crossbar switch of claim 8, wherein each said output port arbiter is operative to monitor said N request input lines, and to send an output port busy indication to input ports that were not granted access, by asserting the acknowledge lines for those input ports, the input ports that were not granted access being placed in said first-level scoreboard reservation, hereby giving preference to these input ports at the next output port ownership arbitration, and the output port busy indication being de-asserted whenever the output port is ready for a new output port arbitration.

11. The crossbar switch of claim 9, wherein said output port arbiter further includes a second-level aging scoreboard mechanism for buffer reservation.

12. The crossbar switch of claim 11, wherein the output port arbiter that granted one input port access, is operative to accept a data call from said one input port if a free output port buffer within a virtual channel and/or priority class for that data cell exists, by asserting the acknowledge line for said one input port, or to reject the call from said one input port if no free output port buffer exists within a virtual channel and/or priority class for that data cell, by not asserting the acknowledge line for said one input port.

13. The crossbar switch of claim 12, wherein an output port is operative to reserve, after having rejected a data cell from said one input port, an entry in the said second level scoreboard, hereby reserving an entry for this data cell during a next arbitration interval.

14. The crossbar switch of claim 8, wherein an output port is interpreted to be not operational if it does not react to any request input line.

15. The crossbar switch of claim 1, wherein each said input port scheduler is operative to remove a data cell from its corresponding input port buffer, if an output port for which that data cell is destined, is not operational.

16. The crossbar switch of claim 1, wherein each input port scheduler is operative to retry request for transmission of a data cell to an output port until that output port grants ownership to the input port in question.

17. The crossbar switch of claim 14, wherein each input port scheduler is operative under a protocol that does not allow it to transmit any data cell within one certain virtual channel or priority to any output port holding a previously transmitted data cell from the same input port within said certain virtual channel or priority and for which the output port in question did not have sufficient buffer space, said previously transmitted data cell being reserved in the output port arbiter second level scoreboard, before said previously transmitted data cell is finally accepted by said output port, however, to ensure fairness and forward progress between various output ports and/or between virtual channels/priorities, said protocol does allow said scheduler to transmit a data cell to another output port or within another virtual channel/priority.

* * * * *

UNITED STATES PATENT AND TRADEMARK OFFICE
CERTIFICATE OF CORRECTION

PATENT NO.    : 6,633,580 B1
DATED         : October 14, 2003
INVENTOR(S)   : Torudbakken et al.

It is certified that error appears in the above-identified patent and that said Letters Patent is hereby corrected as shown below:

<u>Column 7,</u>
Line 43, after the word "accepted" insert the words -- data cell --.

Signed and Sealed this

Twenty-seventh Day of January, 2004

JON W. DUDAS
*Acting Director of the United States Patent and Trademark Office*